June 8, 1943.  G. D. WEBBER  2,321,441
METHOD AND MACHINE FOR SURFACING METAL
Filed June 30, 1941  4 Sheets-Sheet 2
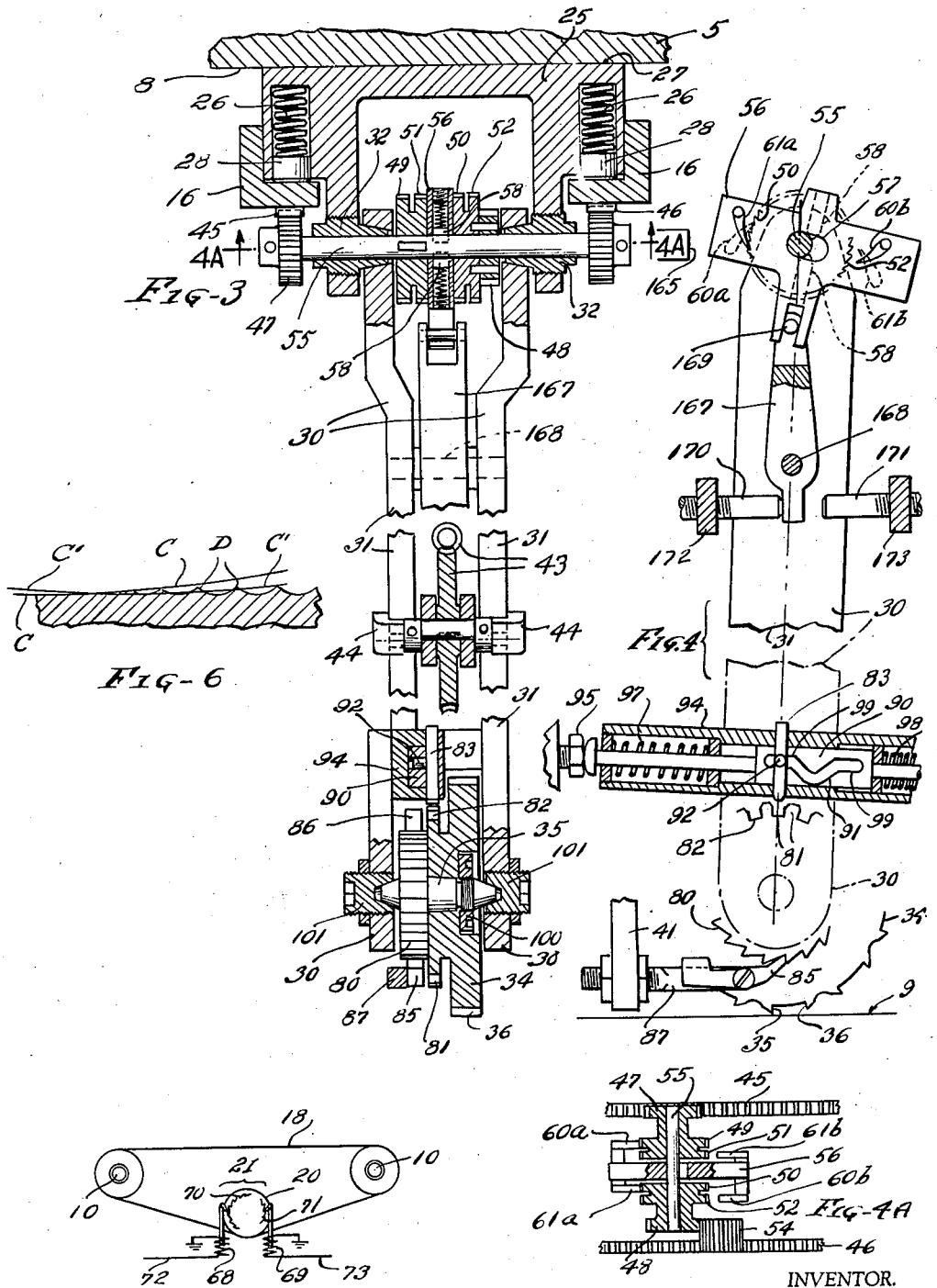
INVENTOR.
GEORGE D. WEBBER
BY
George M. Soule
ATTY.

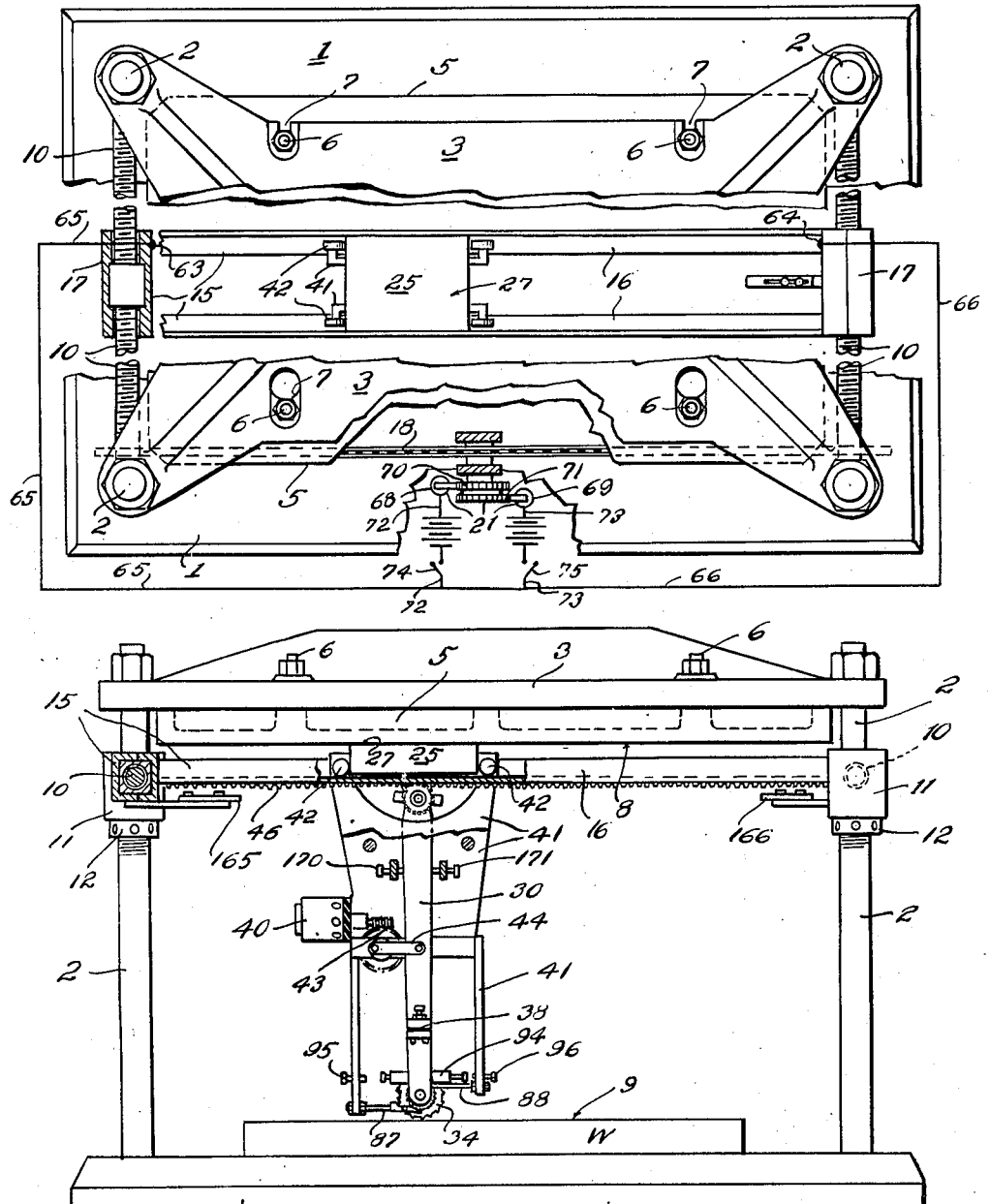

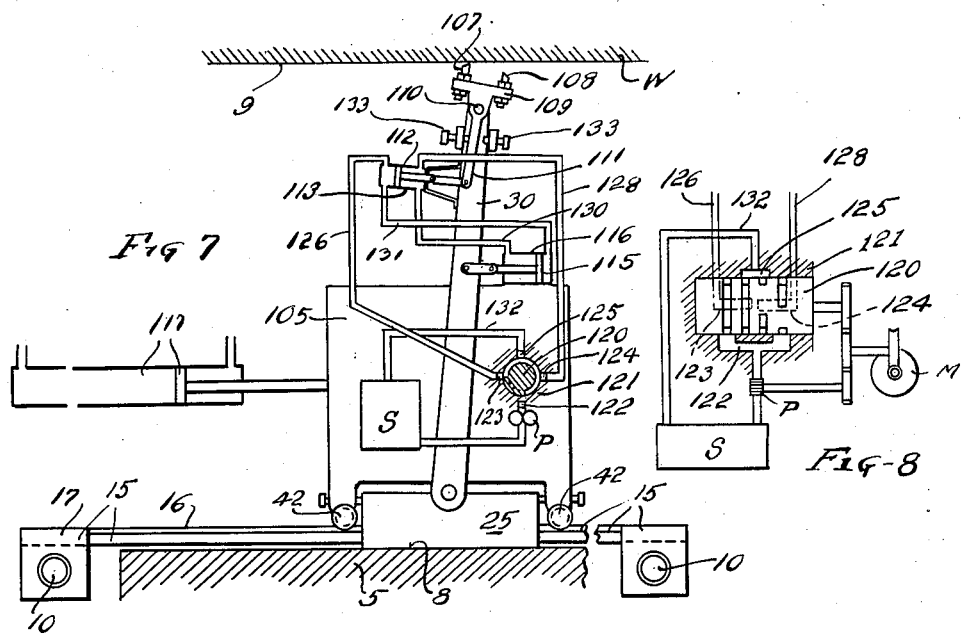

June 8, 1943.  G. D. WEBBER  2,321,441
METHOD AND MACHINE FOR SURFACING METAL
Filed June 30, 1941  4 Sheets-Sheet 4
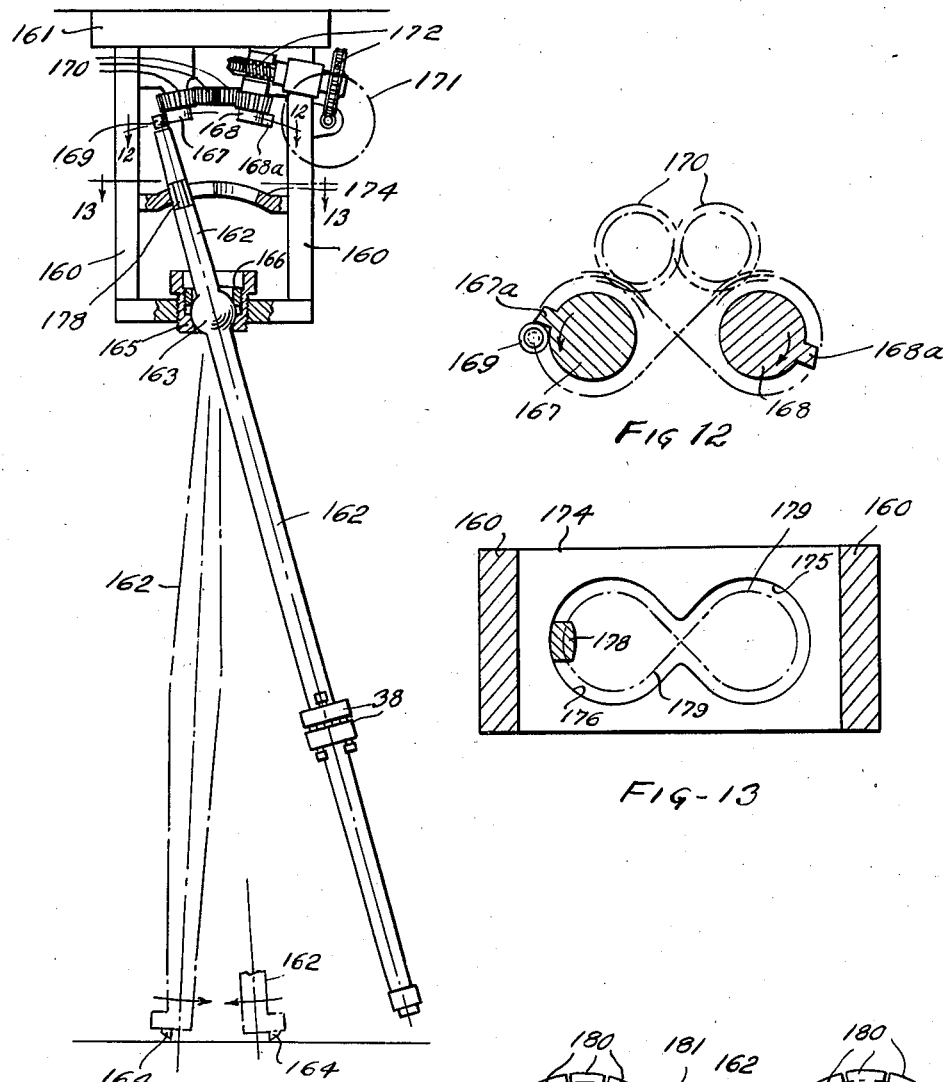
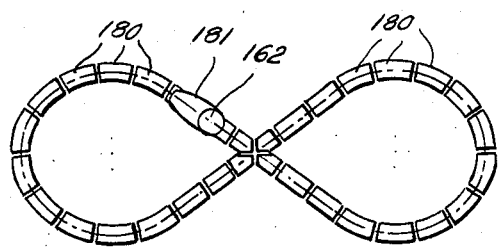
INVENTOR
GEORGE D. WEBBER
BY
George M. Souls
ATTORNEY Patented June 8, 1943

2,321,441

UNITED STATES PATENT OFFICE 2,321,441

METHOD AND MACHINE FOR SURFACING METAL

George D. Webber, Cleveland, Ohio

Application June 30, 1941, Serial No. 400,453

20 Claims. (Cl. 90—38)

This invention relates to mechanisms for surfacing metal parts, and particularly to a method and machine for accomplishing results comparable essentially to hand scraping as on bed plates, guide rails, etc. of machine tools. The above indicates the general object.

More specific objects include the provision of mechanism having a surface cutting tool which will operate by strokes directed substantially parallel to the surface of a work piece and progressively in a manner to scrape or finish large areas thereof; mechanism having a tool carrier capable of successively moving scraping or planing tools into cutting position during part of each complete work stroke and into idle position during the remaining part (i. e. return part of stroke); mechanism capable of performing successive cutting strokes directed generally transversely of each other; having means for distributing tool wear to a considerable number of cutting edges, each operable in the same manner to produce a substantially flat or uniformly smooth surface with no measurable deviation from the desired plane or shape; mechanism having means to cause automatically the necessary relative motion of the tool or tools and work piece whereby to cause a complete finishing operation on the work irrespective of size, and mechanism having other novel characteristics and features to be brought out later herein.

Ordinarily, base plates, tool supports, and the like on machinery and apparatus for performing cutting operations, measuring, etc. are scraped by hand to remove machining tool marks and produce a substantially flat surface. This is usually done by short strokes of a hand tool, the work being checked for depth of cut (e. g.) by means of applying coloring matter to the work which when wholly removed by the scraper tool on a final working of the piece shows that the work is finished. Scraping by hand is tedious and time consuming. The present invention enables precision scrape-finishing operations over large areas to be done entirely automatically and much more efficiently than by hand.

In the drawings, showing the invention more or less diagrammatically as adapted for scraping operations, Fig. 1 is a plan view of a scraping machine in which the work surfacing is accomplished according to the surface of a master plate; Fig. 2 is a side elevation of said machine (partly broken away); Fig. 3 is a relatively enlarged sectional view taken as indicated on Fig. 2; Fig. 4 is a more or less diagrammatic view illustrating the interrelationship of various parts shown in Figs. 2 and 3 as though viewed at right angles to Fig. 3; Fig. 4A is a sectional view taken as indicated on line 4A—4A on Fig. 3; Fig. 5 is a diagram showing one manner of advancing a main tool carriage over the work in one direction, Fig. 6 is a greatly enlarged sectional view of a surface to be finished and the manner the present machine operates thereon; Fig. 7 is a modified apparatus wherein movement of a pivotal tool carrier, the tools and other parts is accomplished hydraulically; Fig. 8 is a diagram explanatory of Fig. 7; Fig. 9 is a view corresponding generally to Fig. 2 showing modifications in respect to supporting a pivoted tool carrier and the work; Fig. 10 is a diagram showing another manner of pivotally supporting a tool carrying arm; Fig. 11 is an assembly view showing one manner of obtaining relatively crossed scraping cuts using, for example, a single cutting tool; Figs. 12 and 13 are sectional views (partly diagrammatic) taken as indicated at 12—12 and 13—13 on Fig. 11, and Fig. 14 is a diagram showing an electro-magnetic driving arrangement for a tool arm operating in the manner exemplified by Fig. 11.

Referring to Figs. 1 to 5, a suitably heavy base or bed is shown at 1 supporting, as on columns 2 a bridge 3 which connects all the columns. 5 is a master plate which, as shown, is adjustably suspended from the bridge as by bolts 6. These may occupy slots 7 in the bridge so that the master can be readily mounted on the bridge and dismounted. The master has a planar lower face 8, finished so that it is as nearly perfectly smooth as possible. The work (plate W) to be scraped lies on the bed in such position that the top surface 9 of the work is parallel to the under surface 8 of the master 5. For the purpose of adjusting the two surfaces 8 and 9 into substantially parallel relationship, either or both the master and work are provided with suitable leveling means (e. g. screw jacks, not shown) and the perpendicular distances between the two are checked at various points, as by means of gages.

Carried as on the columns 2 are parallel horizontal guides 10 (shown as screws mounted on blocks 11 on the columns). Adjusting collars 12 threaded to the columns may support the blocks 11 so that they can be individually positioned at the proper height and so that the axes of the two screws lie approximately in a plane parallel to the master or reference surface 8. The guides 10 support a framework or main tool carriage 15 for movement parallel to the guides. As shown, the carriage 15 comprises rails 16 of angle section, the ends of which are fixed to blocks 17. The blocks 17 constitute or carry threaded followers for respective screws 10 so that the carriage 16 can be caused to traverse the work surface 9 by concurrently turning the screws. The screws may be interconnected by a sprocket chain 18 (see Fig. 5) and appropriate sprocket wheel or any other connecting mechanism. A master driving sprocket is indicated at 20, Fig. 5 and a reversible mechanism 21 (to be described later) operates the master sprocket to turn the screws 10 in the desired directions.

The carriage rails 16 guide and support a master or reference surface follower block or plate 25 (rider) in contact with the surface 8 of the master. A substantial area of the upper face of the rider 25 is always kept in full contact with the master surface, although, to save power in moving the rider, the actual contact may be through any appropriate friction reducing means, e. g. steel balls. Springs 26 set into sockets in the rider 25 press downwardly on the rails 16 with sufficient force to hold the top face portions 27 of the rider in snug sliding contact with the master. The springs are carefully calibrated so as to exert substantially equal force upwardly against the rider 25. The springs may act on the rails through pressure shoes 28 slidably mounted in the spring sockets, which shoes ride the horizontal flanges of the rails 16. Rollers may be employed in place of the shoes.

Depending from the rider 25 which follows the master surface 8 is an arm 30 which as shown in Fig. 3 may comprise spaced metal strips 31 pivoted as on adjustable conical sleeves 32 on the rider. At the lower end of the arm 30 is a scraping tool 34 having cutting faces 35 and 36. There may be any number of cutting faces and in order to reduce error because of wear on the faces the tool 34 may be circular and have a multiplicity or series of cutting faces presentable successively to the work. If each face has a cutting edge disposed the same distance from the pivotal center of the tool (pintle 35) the arm can then be caused to cut the work on each stroke, assuming a complete oscillation or to and fro swinging movement of the arm is considered to constitute two strokes.

Since the reach of the arm is always the same distance from the master or reference surface the cutting will always be to the same depth irrespective of the position occupied by the rider on the master surface. Thus by progressively moving the rider over the master surface the entire face of the work piece can be finished so that it is a duplicate of the master. The cutting strokes follow fairly closely the desired planar form of the finished work because the motion of the tool edge is nearly planar due to the remoteness of the pivot of the arm from the work. C in Fig. 6 indicates a cut taken by a tool face or edge (e. g. 35) on one stroke and C' a cut taken on the next succeeding stroke (e. g.) as by the face or edge 36. The manner of removing the hill effects D which result from the usual finishing operations (e. g. planing or grinding) will be obvious from Fig. 6. Actually the arcs C and C' are on shorter radii relative to the surface effects D than would be employed in practice. The advance of the tool in the direction in which it swings, and laterally, can be governed according to the radius on which the tool operates, so that a theoretically flat surface may be approached very closely if desired. The contour of the scraping edges of the teeth 35 and 36 preferably is the same as the radius of the cutting, i. e. the effective radius of the arm 30.

It may be noted that since the advancing of the rider on the master or reference surface occurs only between cutting strokes there is never any such pressure applied as would be likely cause wearing of the contacting surfaces. These surfaces are, of course, kept oiled during operation of the machine.

Adjustment for depth of cut of the scraping tool or tools may be accomplished by lengthening and shortening of the arm 30—conventional screw adjustment being indicated at 38 Fig. 2.

For swinging the arm 30 a suitable motor such as shown at 40 (e. g. electric motor) may be supported on a frame 41 depending from the rider or from the carriage 15. As shown (Fig. 2 only) the frame 41 has rollers 42 which ride on the rails 16. The frame 41 moves with the rider parallel to the master surface but no vertical movement of the frame 41 (should it have any) can be transmitted to the rider. The motor has reduction gearing at 43, a driven element of which gearing is connected to the arm 30 as by a link 44. The arm may be oscillated, for example at 150 to 200 R. P. M. depending somewhat upon the length and weight of the arm and the mechanism connected therewith—the higher speed mentioned being faster than hand scraping as usually done. The motor should have a heat insulating base (and/or an efficient cooling system) to prevent transmission of heat to the arm 30.

Advance of the rider 25 and the cutting tool along the rails 16 of the carriage 15 may be accomplished mechanically as a function of the swinging of the arm 30.

As shown in Fig. 3, and more or less diagrammatically or schematically in Figs. 4 and 4A, the rails 16 have rack teeth 45 and 46 thereon respectively, drivingly connected with pinions 47 and 48 which are drivingly rigid respectively with ratchet wheel assemblies 49, 51 and 50, 52 as schematically shown in Fig. 4A. The pinion 47 meshes directly with the rack 45 and the pinion 48 drives reversing pinion 54 which, in turn, meshes with the rack 46.

Each of the ratchet wheel assemblies may, of course, be connected with both racks through suitable cross shafting suggested in part by the cross shaft 55 on which the ratchet assemblies are carried, said shaft, as shown in Fig. 3, having also a pinion 47a thereon in mesh with the rack 46. Similarly the reversing pinion 54 could be connected with a pinion in mesh with the rack 45 for a balanced driving arrangement.

A pawl carrier 56 is slidably and pivotally carried on the cross shaft 55, at a slot 57 in the carrier. Snap action elements (e. g. spring pressed plungers) 58 maintain the carrier with the ends of the slot 57 alternately in pivotal abutting relation to the cross shaft when the pawl carrier is shifted to respective operating positions. Each end of the pawl carrier has a set of two pawls thereon one of each set in position to mesh with a clockwise driving ratchet wheel of one ratchet wheel assembly and the other with a counterclockwise driving ratchet wheel of the other ratchet wheel assembly. The clockwise driving pawls are indicated at 60a and 60b and the counterclockwise driving pawls at 61a and 61b. The clockwise driving pawls 60a and 60b are at opposite ends of the carrier so that only one of these two pawls (e. g. 60a) operates a ratchet wheel (e. g. 49) during ratcheting operations of the carrier in one shifted position of the carrier, and the other (60b) operates a wheel (52) in the other shifted position of the carrier. The other two pawls (e. g. counterclockwise driving pawls 61a and 61b) operate alternately in the two shifted positions of the carrier, as will be obvious, to drive the counterclockwise driving ratchet wheels (50 and 51). Suitable abutments 165 and 166 on the carriage 15, as on the screw follower portions 17, Fig. 2, operate to shift the pawl carrier to respective operating positions, so that when the rider 25, arm 30 and the ratchet operating mechanism is moved to the desired limit to the left on the carriage 15 the pawl carrier is shifted to the right (position shown in Figs. 4 and 4A) and similarly shifted to the left at the end of right hand movement. This automatically readjusts the pawls for driving the rider, etc. alternately to the right and to the left.

For causing the swinging of the arm 30 to advance the rider 25 and frame 41 to a new position near the end of each stroke of the arm 30 a lever 167 is pivoted to the arm as at 168. The lever has a relatively long arm, upwardly of the pivot, connected as at 169 (pin and slot connection as shown) with the pawl carrier 56. The shorter lower arm of the lever contacts alternately with abutments 170 and 171 carried on cross members 172 and 173 of the frame 41 but swings clear of the abutments while the cutting tool 34 is in contact with the work. This lever and abutment arrangement transmits enough tilting motion to the pawl carrier near the end of one stroke of the arm 30 to turn the ratchet wheel which is engaged by one pawl (60a or 61a in the setting of the carrier shown in Fig. 4) and thus to advance the rider 25 parallel to the rails 16 through pinion 47 which meshes directly with the rack 45, and, near the return stroke of the arm, enough tilting motion of the pawl carrier to turn the reverse gear 48 and 54 thereby to advance the rider in the same direction along the rails 16. The same step by step advance of the rider 25, etc. is accomplished when the pawl carrier is shifted to the left Fig. 4 at the end of right hand travel of the rider 25 but the direction of advance is reversed when the pawl carrier is reset.

At each reversal of movement of the tool carrier it is necessary to move the carriage 15 on the rails (screws) 10, and for this purpose the tool carrier at the ends of its reciprocations may actuate respective electric switches controlling the mechanism 21, mentioned earlier, the switches being positioned, for example, as indicated at 63 and 64 (Fig. 1 only). Conductors 65 and 66 lead from the switches to respective solenoids 68 and 69 (Figs. 1 and 5); and each of the solenoids operates a driving pawl for turning respective relatively reversed ratchet wheels 70 and 71 connected to the master sprocket 20 of the connecting sprocket chain 18 of the screws 10. Direction of operation depends upon which of the solenoids is placed in the circuit controlled by the switches. The arrangement may be such that both switches 63 and 64 cause operation of one solenoid (e. g. 68) during movement of the main carriage 15 in one direction on the screws 10 and both operate the other solenoid (e. g. 69) during movement of said carriage in the opposite direction. Switches 74 and 75 in conductor branches 72 and 73, leading to the solenoids, are closed alternately (as by hand) to determine which solenoid will become operative. Limit switches (not shown) would, of course, be used to shut down the machine when the entire top surface of the work piece W has been scraped.

It is necessary to move the scraping tool to inoperative position on each back stroke so that it will not drag on the work. The arrangement shown (Figs. 3 and 4) moves the cutting edge which operates on one stroke to idle position at the end of that stroke and moves another cutting edge into operating position, so that each "return" stroke of the arm 30 is actually a cutting stroke. Figs. 3 and 4 show mechanical means for accomplishing that operation.

The cutting wheel 34 has rigid therewith an indexing ratchet 80 for turning the wheel step by step through angles corresponding to the spacing of the cutting teeth on the wheel, and, additionally, a disc 81 with peripheral notches 82 adapted for engagement with a precisionizing latch plunger 83 arranged to engage the notches.

The ratchet wheel 80 may be operated by pawls 85 and 86 (see Fig. 3) on carriers 87 and 88 mounted on the frame 41. One pawl operates at one end of each swing of the arm 30 and the other at the opposite end of such swing, so that a proper cutting tooth is presented for operation prior to engagement with the work.

The precisioning plunger or latch 83 is moved to position to release the cutting wheel, on each stroke of the arm 30, prior to the operation of the indexing pawls. As shown a double cam member 90 has a cam slot 91 therein engaged by a follower 92 on the latch plunger. The cam member 90 slides in a suitable guide 94 fixed on the arm 30, crosswise thereof, and is shifted alternately to positions withdrawing the latch plunger from the notches of the disc 81 by abutments 95 and 96 on the frame 41. Centering springs 97 and 98 return the cam to latch-seating position when the cutting wheel again approaches the work. Each cam portion indicated at 99 constitutes a dwell in respect to the latch plunger so that the latch remains withdrawn for a short period during which the ratchet wheel 80 is turned to index the cutting wheel.

The cutting wheel 34 may be centered on the pintle 35 (Fig. 3) by a slight taper fit and clamping nut 100, and the pintle, in turn, centered by engagement with tapered sockets in adjustable supporting sleeves 101 on the arm 30.

The arrangement substantially as described above may be inverted, so that the weight of the arm 30 and elements carried thereby (and the frame 41 if mounted on the rider) tends to maintain the rider in full face contact with the master surface at all times. This enables elimination of the pressure springs 26 for the rider 25.

Referring to Figs. 7 and 8, these show, diagrammatically, hydraulic means for adjusting the cutting tools and swinging the tool carrying arm, and also the inverted general arrangement mentioned above. The master or reference surface 8 faces upwardly and the work surface 9 to be finished overhangs the master surface. The guide rails (screws 10) for the carriage 15 (rails 16 and screw followers) are disposed beside the master plate 5. The rider 25 pivotally carries the arm 30, and a frame 105 (corresponding to the frame 41 of Fig. 2) carries the hydraulic mechanism and rides on the rails 16. The rider moves with the frame 105 as in the previously described construction.

Two tools 107 and 108 are shown, carried on a rocker 109 pivoted as at 110 to the arm 30. The rocker has a depending arm 111 to which a piston 112 in a hydraulic cylinder 113, carried on the arm 30, is suitably connected. Another piston 115 in a cylinder 116 carried by the frame 105 is connected to the arm 30 to oscillate the latter. The frame may also be reciprocated lengthwise of the guide rails 16 by a third cylinder and piston 117. All the cylinders may be supplied with hydraulic fluid through a single power driven valve; but, as shown, only the cylinders 113 and 116 are so supplied.

S is a sump from which a pump P driven by a motor M draws fluid and delivers it to a rotary valve cylinder 120, having a housing 121, through a manifold 122 in the housing. The motor also drives the valve cylinder. Spaced about the valve and formed in the valve housing are outlet chambers 123, 124 and 125. Peripheral grooves in the valve cylinder register with the inlet manifold and outlet chambers in a well known manner to control the flow of fluid to the cylinders 113 and 116 and return flow therefrom to the sump. A fluid line 126 leads from the chamber 123 to the end of the cylinder 113 which lies remotely of the connection of the piston 112 and arm 111 of the tool carrying rocker 109. The discharge chamber 124 is connected through a line 128 to the opposite end of the cylinder 113. The relatively near ends of the cylinders 113 and 116 are connected by a line 130 and the relatively remote ends of said cylinders by a line 131. A line 132 connects the chamber 125 with the sump.

In operation, assuming the arm 30 has been rocked to the limit of its right hand stroke, the valve now operates to supply fluid to the cylinder 113 through the line 126, thus causing the rocker 109 to move the tool 107 out of operating position and the tool 108 into operating position. Adjustable stops 133 arrest the tools in proper position (e. g. supplemental to other adjustment the tools or arm may have toward and away from the work) so that each tool cuts to the same depth. After the tool 108 has been moved into operating position, the hydraulic fluid from the cylinder 113 which passes to the cylinder 116 through the line 131 operates to swing the arm 30 to cause the tool 108 to perform its scraping or cutting operation. The line 131 may be adjustably restricted so as to assure operation of the piston 115. The operation of the pistons is exactly the reverse of that just described on the return stroke, the tool 107 being then active and 108 idle, as will be obvious.

As in the case of the previously described mechanism, wherein the feeding or advancing movements of the cutting tool support are performed mechanically, the feeding or advancing operations of the hydraulic mechanism 117 are so timed as to take place while the cutting tools are out of contact with the work, thus minimizing wear on the master or reference surface. In the other embodiments, described below, the same relationship, as to timing, would, of course, be maintained.

In Fig. 9 rails 140 (one shown) slidably support the tool carrier 141, which latter corresponds to the rider 25, and the rails are supported for movement transversely of their longitudinal extent as on guiding and feeding screws 10. In such case the guide rails 140 and the screws or transverse guides would be of sufficient depth or vertical section to avoid the infinitesimal sagging which might otherwise take place.

The work W1 as shown in Fig. 9 is representative of one of a pair of guide rails of a lathe or other machine tool. The support for such work could be pivoted as on a mounting bar 143 so that the various surfaces to be leveled or scraped (9a, 9b, 9c and 9d) can be elevated and locked into operating range of the cutting or scraping tool or tools (e. g. 34) carried on the arm 30.

In Fig. 10, 150 is the rider, corresponding to 25 in Figs. 1 and 2. The rider has an arcuate track 151 thereon on which a base portion 152 of an arm member 153 is supported as on suitable trunnion rollers 154. The cutting tools are carried on the arm 153 (corresponding to 30); and, as will be evident, the arm can be shortened considerably while, in effect, operating on a very long radius.

In order to obtain relatively crossed cutting strokes, as usually done in hand scraping of machined surfaces, the tool arm carriers 25, 141, 150 may each have an additional arm operating for example at right angles to the respective tool arms illustrated, with suitable mechanism for oscillating the additional arm. This is not illustrated because, in general, it would be a matter of duplicating the tool arm oscillating and adjusting arrangements. Because a machine with such an additional tool arm would require greater width than the single arm arrangements described and involve some idle motion on the part of each arm during each complete traverse of the work by the carrier for the arms, it would be desirable to have the machine so arranged that the relatively crossed scraping cuts are made successively on approximately the same zone of the work. This can be accomplished, for example, by the mechanism shown in Figs. 11 to 14.

Fig. 11 shows a rigid frame 160 depending from a carrier 161 such, for example, as the blocks 25, or block 141 (Fig. 9), for the purpose of pivotally supporting the tool carrying arm 162 and guides therefor. The arm 162 has a spherical pivot portion 163 supported on the frame 160 and a single cutting tool 164 at its lower end; and the arm is so guided that the tool moves to and fro in a curved double looped (8-shaped) path—being reversed 180° about the longitudinal axis of the arm 162 between successive scraping cuts on the work. The tool cuts only at each time it traverses the intersecting portions of the 8-shaped path. Feeding of the block 161 along the master surface or guide rails may be accomplished as by means already described, either between successive relatively transverse cuts or between successive complete cutting cycles of the tool, as desired, preferably the former.

The pivotal support for the tool-carrying arm 162, as shown, is simply a spherical socket device 165 adapted to contain an adequate oil supply for the spherical contacting surfaces. A threaded ring 166 with spring means (not shown) may be used to maintain the spherical surfaces in contact. The weight of the arm would ordinarily suffice for this purpose.

The 8-shaped path of swinging movement of the arm 162 (oscillation in a broad sense) can be determined by mechanically guiding the arm as by reversely turned driving discs 167 and 168 (cf. Fig. 12), each provided with a driving lug, as at 167a and 168a respectively, for alternate engagement with an upper end roller 169 on the arm 162. The discs have appropriate interconnecting and driving gearing designated 170, one of the gears being driven as by a motor 171 and reduction gearing 172, as will be obvious from Fig. 11. Cooperating with the discs 167 and 168 at another part of the arm 162 to maintain the 8-shaped path of movement on part of the arm is a generally 8-shaped guide or cam plate 174. The guide surfaces 175 and 176 operatively corresponding to the discs 167 and 168 respectively, are engaged by a specially shaped follower portion 178 of the arm 162 for causing the arm to be turned first to the right about its longitudinal axis through about 180° and then to the left through the same angle thus causing the tool 164 to be properly presented to the work for cutting it at each half cycle of oscillation of the arm. Cutting takes place while the cam follower portion 178 of the arm is moving from one cam surface to the other along the line 179, Fig. 13, and after the driving lugs have disengaged the upper end portion 169 of the arm. The momentum of the arm is sufficient to effect cutting due to the considerable weight of the arm and the shallow depth of cut. The tool may be a diamond or other comparatively hard substance so that wear thereon is negligible.

The driving lugs 167a and 168a release the arm portion 169 just before the follower 178 disengages the respectively cooperating cam and guiding surfaces 175 and 176; and in order that the cutting operation of the tool will not tend to turn the arm 162 about its longitudinal axis the tool may be set centrally of the arm in trailing relation to said longitudinal axis as suggested diagrammatically at the lower central part of Fig. 11. The relation of the tool to said axis (latter indicated by dot and dash lines) is as further brought out by small arrows indicating respectively the directions of movement of the arm while cutting is being effected.

The follower portion 178 of the tool-carrying arm can be provided with suitable rollers, or sets of rollers on each side (not shown), for engagement with the cam surfaces 175 and 176 to reduce friction.

Fig. 14 illustrates diagrammatically a fixed arrangement of electromagnetic pole elements 180 as on the block 161 adjacent the upper end of the arm 162. 181 represents an armature carried rigidly on said end of the arm in slightly spaced relation to the pole elements. The armature 181 may, for example be elongated and in trailing relation to the supporting portion of the longitudinal axis of the arm 162 to insure that the tool will always be presented properly to the work. The electro-magnets if energized serially in accordance with instantaneous positions of the tool carrying arm (through contacts carried by the arm and fixed cooperating electrical contacts—not shown) can be made to operate as a continuous driving motor for the arm and turning means for reversing the tool between successive cutting strokes. Such an arrangement would permit any desired variation in the shape of the 8-shaped path of movement of the arm 162, elimination of the guide cam 174 and also enable positive driving force to be exerted on the arm in all its positions. Since the magnetic pole elements 180 can be arranged in any pattern, the 8-shaped path of the tool can, thereby, be such as to operate with maximum efficiency. The pattern can be a lemniscate, limaçon or any of the variations of the Ovals of Cassini.

Current could also be supplied and interrupted successively in respect to the electromagnets by means independent of the motion of the arm, as well known in the electrical art, more accurately to govern the speed of operation of the tool.

It will be apparent that if the tool carrying arm is not rotated about its longitudinal axis during swinging movement in the 8-shaped path it would then be necessary to provide more than one cutting tool at the free end of the arm which tools could be rendered alternately active and idle so as to be presented into cutting and retracted relation to the work. Suitable means for so alternately or successively presenting proper tools to the work (Figs. 3, 4 and 7) would be used with the arm 162, in such event. One special advantage of swinging the tool carrying arm in an 8-shaped path is that the mechanism is never subjected to shock during reverse of movement of the arm, hence the scraping operation could be effected somewhat faster than with the previously described arrangements.

I claim:

1. A metal surfacing machine having means to support work to be surfaced, means to support a cutting tool for movement over the work and means to move the supports relative to each other between cutting operations to change the operating region of the tool on the work, characterized in that the tool supporting means moves to and fro to drive the tool on its cutting stroke and supports the tool with its cutting edge at the end of a relatively long radius such that the tool operates to cut practically parallel to the work surface with successively overlapping cutting strokes.

2. The method of scraping surfaces comprising progressively advancing a cutting tool step by step over the work and causing the tool between successive advancing movements, to swing to and fro into and out of cutting contact with the work and approximately parallel thereto.

3. In a metal cutting machine having a rectilinear guiding means, a rider on the guiding means, a tool-carrying arm swingably mounted on the rider and extending at right angles to the guiding means in one position of the arm and having a cutting tool at its free end, means for swinging the arm to and fro to cause the tool during the swinging movement of the arm to make cuts in a work surface disposed parallel to the guiding means, and means for relatively advancing the rider and work between successive cutting strokes of the arm.

4. A machine according to claim 3 wherein the arm carries means to move the cutting tool clear of the work on a return stroke of the arm after each cutting stroke.

5. A machine according to claim 3 wherein the guiding means comprises a pre-surfaced master plate on which the rider is borne with substantially uniform pressure.

6. A machine according to claim 3 wherein the guiding means comprises a presurfaced master plate, rails extending substantially parallel to the master surface of the plate and guiding the rider for movement on said surface, and means reacting in opposite directions on the rider and rails perpendicular to the master surface, whereby to hold the rider in substantially uniform contact with the master surface notwithstanding some deviation of the rails or portions thereof out of parallelism with the master surface.

7. A machine according to claim 3 wherein the guiding means comprises a presurfaced master plate and the rider is held in contact with the master surface by gravity.

8. A machine according to claim 3 including swinging means for the arm comprising an electric motor and reduction gearing connected with the arm.

9. A machine according to claim 3 having power means, for oscillating the arm, comprising a hydraulic cylinder.

10. A machine according to claim 3 wherein the means for relatively advancing the rider and work is a reversible ratchet mechanism operated to cause such advancing movement by the swinging movements of the arm.

11. A machine for purposes such as described comprising a plate having a master surface, a rider for the master surface, guiding means for enabling movement of the rider over the master surface, a tool carrying arm swingably mounted on the rider, and power means supported by the guiding means and connected with the arm, for swinging the arm on relatively short strokes.

12. A machine according to claim 11 wherein the guiding means includes a supporting rail for the rider and the power means is mounted on the rails independently of the rider in such manner that operation of the power means will not tend to rock the rider on the master surface.

13. A metal surfacing machine comprising a tool support and means carrying or mounting the same for swinging movement of the support to and fro along the work in a manner to cause a tool carrying portion of the support to move toward and away from the work during such swinging movement, a cutting tool turnably mounted on a fixed axis on said support and having cutting elements operatively facing in opposite directions along a line parallel to the work to be surfaced, and means carried on the support and acting on the tool independently of engagement of the cutting elements with the work and following successive cutting operations thereof on the work, to move each of the cutting elements automatically into cutting and non-cutting position about said fixed axis, said means operating to move one of the cutting elements into cutting position and by the same operation to move another cutting element into non-cutting position.

14. A machine according to claim 13 wherein the tool is turnably mounted for indexing movement on the tool support and has a series of cutting teeth operatively facing alternately in opposite directions.

15. A machine according to claim 13 incorporating means cooperating with the swingable tool support in a manner to cause the swinging movement of the support to reset the cutting elements at or near the end of each swinging movement.

16. A machine according to claim 13 wherein the tool is a disc rotatable for indexing movement on the support and with alternately disposed cutting teeth facing in opposite directions, precisionizing latching means on the support releasable from and engageable with notches operatively rigid with the disc, and means on the machine rendered operative at or near completion of the swinging movements of the support to release the disc.

17. A work surfacing machine having a rectilinear guide, a rider on the guide, an arm swingable on the rider into and out of positions perpendicular to the guide for surfacing work mounted parallel to the guide, a tool having a plurality of cutting teeth which teeth face in opposite directions, a tool support pivoted to the arm and carrying the teeth, a frame connected with the rider and extending adjacent the arm, a hydraulic cylinder and piston carried by the arm and operatively connected with the tool support for rocking the same, a hydraulic cylinder and piston carried by the frame and operatively connected with the arm to swing it, and a hydraulic system connected to both ends of each of the cylinders and operable to cause the cylinder and piston carried by the arm to adjust the tool support for presenting proper tools to the work before the other piston and cylinder operates to swing the arm past cutting position.

18. A metal surfacing machine comprising a support for work, a guide mounted parallel to the surface of the work to be cut, follower means on the guide, swingable cutting means carried on the follower means and arranged to make light cuts in the work substantially parallel to said surface during swinging of said cutting means, means to cause the follower means to be maintained in uniform contact with the guide to determine the plane of operation of the cutting means, and means to cause the cutting means to cut first in one direction and then at an angle to the first direction in approximately the same position on the work.

19. A metal surfacing machine according to claim 18 wherein the relatively transverse cuts are done by a tool or tools carried on a single swingable arm.

20. A metal surfacing machine comprising a support for work, a master guide surface, a follower maintained in uniform contact with said surface while moving thereover, an arm universally pivoted on the follower, which arm carries a cutting tool at one end for contact with the work during a swinging movement of the arm across the work, and means for causing swinging of the arm in an 8-shaped path while turning the arm about its longitudinal axis whereby to cut the work at the intersection of the "8" twice for each complete cycle of operation of the arm.

GEORGE D. WEBBER.